United States Patent
Joly et al.

(10) Patent No.: US 11,078,805 B2
(45) Date of Patent: Aug. 3, 2021

(54) INCLINATION OF FORWARD AND AFT GROOVE WALLS OF CASING TREATMENT FOR GAS TURBINE ENGINE

(71) Applicant: United Technologies Corporation, Farmington, CT (US)

(72) Inventors: Michael M. Joly, Hebron, CT (US); Simon W. Evans, Farmington, CT (US); Dilip Prasad, North Granby, CT (US); Gorazd Medic, West Hartford, CT (US); Georgi Kalitzin, West Hartford, CT (US); Dmytro Mykolayovych Voytovych, Rocky Hill, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 36 days.

(21) Appl. No.: 16/384,076

(22) Filed: Apr. 15, 2019

(65) Prior Publication Data

US 2020/0325790 A1  Oct. 15, 2020

(51) Int. Cl.
*F01D 11/10* (2006.01)
*F04D 29/52* (2006.01)
*F04D 29/68* (2006.01)
*F02C 7/28* (2006.01)

(52) U.S. Cl.
CPC .............. *F01D 11/10* (2013.01); *F02C 7/28* (2013.01); *F05D 2240/55* (2013.01)

(58) Field of Classification Search
CPC .. F04D 29/526; F04D 29/685; F04D 27/0207; F04D 26/164; F04D 29/321; F01D 11/10; F01D 11/08; F01D 25/24; F01D 5/145; F01D 11/001; F05D 2270/101; F05D 2240/55; F02C 7/28
See application file for complete search history.

(56) References Cited

U.S. PATENT DOCUMENTS

| 3,575,523 A | * | 4/1971 | Gross, Jr. | F01D 11/08 415/171.1 |
| 4,086,022 A | * | 4/1978 | Freeman | F01D 11/08 415/119 |
| 5,137,419 A | | 8/1992 | Waterman | |
| 7,645,121 B2 | | 1/2010 | Tudor | |

(Continued)

OTHER PUBLICATIONS

Extended European Search Report for EP Application No. 20157532.1; dated Aug. 12, 2020 (8 pages).

*Primary Examiner* — J. Todd Newton, Esq.
*Assistant Examiner* — Eric J Zamora Alvarez
(74) *Attorney, Agent, or Firm* — Cantor Colburn LLP

(57) ABSTRACT

A compressor for use in a gas turbine engine including: an airfoil configured to rotate about an engine central longitudinal axis of the gas turbine engine; a casing, the casing including a radially inward surface; and a groove located within the casing opposite the airfoil, the groove is recessed in a radially outward direction from the radially inward surface of the casing, wherein the groove is defined by a forward groove wall, an aft groove wall opposite the forward groove wall, and a base groove interposed between the forward groove wall and the aft groove wall, and wherein the forward groove wall is operably shaped to generate an aft directed jet.

9 Claims, 6 Drawing Sheets

(56) References Cited

U.S. PATENT DOCUMENTS

| | | | |
|---|---|---|---|
| 8,257,022 B2* | 9/2012 | Guemmer | F04D 29/685 |
| | | | 415/58.6 |
| 2003/0138317 A1 | 7/2003 | Barnett et al. | |
| 2010/0014956 A1 | 1/2010 | Grummer | |
| 2015/0226078 A1* | 8/2015 | Perrot | F04D 29/526 |
| | | | 415/173.4 |
| 2017/0328377 A1 | 11/2017 | Mallina et al. | |

* cited by examiner

INCLINATION OF FORWARD AND AFT GROOVE WALLS OF CASING TREATMENT FOR GAS TURBINE ENGINE

STATEMENT OF FEDERAL SUPPORT

This invention was made with Government support under Contract No. N00014-18-C-1012 awarded by the United States Navy. The Government has certain rights in the invention.

BACKGROUND

The subject matter disclosed herein generally relates to gas turbine engines and, more particularly, to groove designs for a blade casing of the gas turbine engine.

One potential limiting factor in gas turbine engines may be the stability of the compression system. In that regard, greater stability in the compression system supports improved engine operation. The stability of the compression system in a gas turbine engine is limited by the stalling behavior of the compressor. In some compressors, the initiation of a stall may be driven by the tip leakage flow through the tip clearance between a rotor blade airfoil and compressor casing, which forms the outer diameter of the compressor main gas flow path. The detrimental characteristics of tip leakage flow may predominantly be from reverse tip leakage flow, that is, tip leakage flow moving aft to forward.

SUMMARY

According to an embodiment, a compressor for use in a gas turbine engine is provided. The compressor including: an airfoil configured to rotate about an engine central longitudinal axis of the gas turbine engine; a casing, the casing including a radially inward surface; and a groove located within the casing opposite the airfoil, the groove is recessed in a radially outward direction from the radially inward surface of the casing, wherein the groove is defined by a forward groove wall, an aft groove wall opposite the forward groove wall, and a base groove interposed between the forward groove wall and the aft groove wall, and wherein the forward groove wall is operably shaped to generate an aft directed jet.

In addition to one or more of the features described above, or as an alternative, further embodiments may include that the aft groove wall is oriented about perpendicular relative to the radially inward surface of the casing.

In addition to one or more of the features described above, or as an alternative, further embodiments may include that the forward groove wall is linearly shaped.

In addition to one or more of the features described above, or as an alternative, further embodiments may include that the forward groove wall is curved in shape.

In addition to one or more of the features described above, or as an alternative, further embodiments may include that the forward groove wall is concave in shape.

In addition to one or more of the features described above, or as an alternative, further embodiments may include that the forward groove wall is oriented at an acute angle relative to the radially inward surface of the casing proximate where the forward groove intersects with the radially inward surface of the casing.

In addition to one or more of the features described above, or as an alternative, further embodiments may include that the aft groove wall is operably shaped to reduce airflow separation proximate an intersection of the radially inward surface of the casing and the aft groove wall.

In addition to one or more of the features described above, or as an alternative, further embodiments may include that the aft groove wall is linearly shaped.

In addition to one or more of the features described above, or as an alternative, further embodiments may include that the aft groove wall is curved in shape.

In addition to one or more of the features described above, or as an alternative, further embodiments may include that the aft groove wall is convex in shape.

In addition to one or more of the features described above, or as an alternative, further embodiments may include that the aft groove wall is oriented at an obtuse angle relative to the radially inward surface of the casing.

In addition to one or more of the features described above, or as an alternative, further embodiments may include that the aft groove wall includes a convex portion and a concave portion.

In addition to one or more of the features described above, or as an alternative, further embodiments may include that the casing is located radially outward from the airfoil.

In addition to one or more of the features described above, or as an alternative, further embodiments may include that the casing is located radially inward from the airfoil.

According to another embodiment, a compressor for use in a gas turbine engine, the gas turbine engine including: an airfoil configured to rotate about an engine central longitudinal axis of the gas turbine engine; a casing, the casing including a radially inward surface; and a groove located within the casing opposite the airfoil, the groove is recessed in a radially outward direction from the radially inward surface of the casing, wherein the groove is defined by a forward groove wall, an aft groove wall opposite the forward groove wall, and a base groove interposed between the forward groove wall and the aft groove wall, wherein the aft groove wall is operably shaped to reduce airflow separation proximate an intersection of the radially inward surface of the casing and the aft groove wall, and wherein the aft groove wall is curved in shape.

In addition to one or more of the features described above, or as an alternative, further embodiments may include that the aft groove wall is convex in shape.

In addition to one or more of the features described above, or as an alternative, further embodiments may include that the aft groove wall includes a convex portion and a concave portion.

In addition to one or more of the features described above, or as an alternative, further embodiments may include that the casing is located radially outward from the airfoil.

In addition to one or more of the features described above, or as an alternative, further embodiments may include that the casing is located radially inward from the airfoil.

According to another embedment, a fan case for use in a gas turbine engine is provided. The fan case being configured to enclose an airfoil rotating about an engine central longitudinal axis of a gas turbine engine, the fan case including: a groove located within the fan case opposite the airfoil, the groove is recessed in a radially outward direction from a radially inward surface of the fan case, wherein the groove is defined by a forward groove wall, an aft groove wall opposite the forward groove wall, and a base groove interposed between the forward groove wall and the aft groove wall, and wherein the forward groove wall is operably shaped to generate an aft directed jet.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION

The following descriptions should not be considered limiting in any way. With reference to the accompanying drawings, like elements are numbered alike:

The detailed description explains embodiments of the present disclosure, together with advantages and features, by way of example with reference to the drawings.

DETAILED DESCRIPTION

A detailed description of one or more embodiments of the disclosed apparatus and method are presented herein by way of exemplification and not limitation with reference to the Figures.

Figure 1:
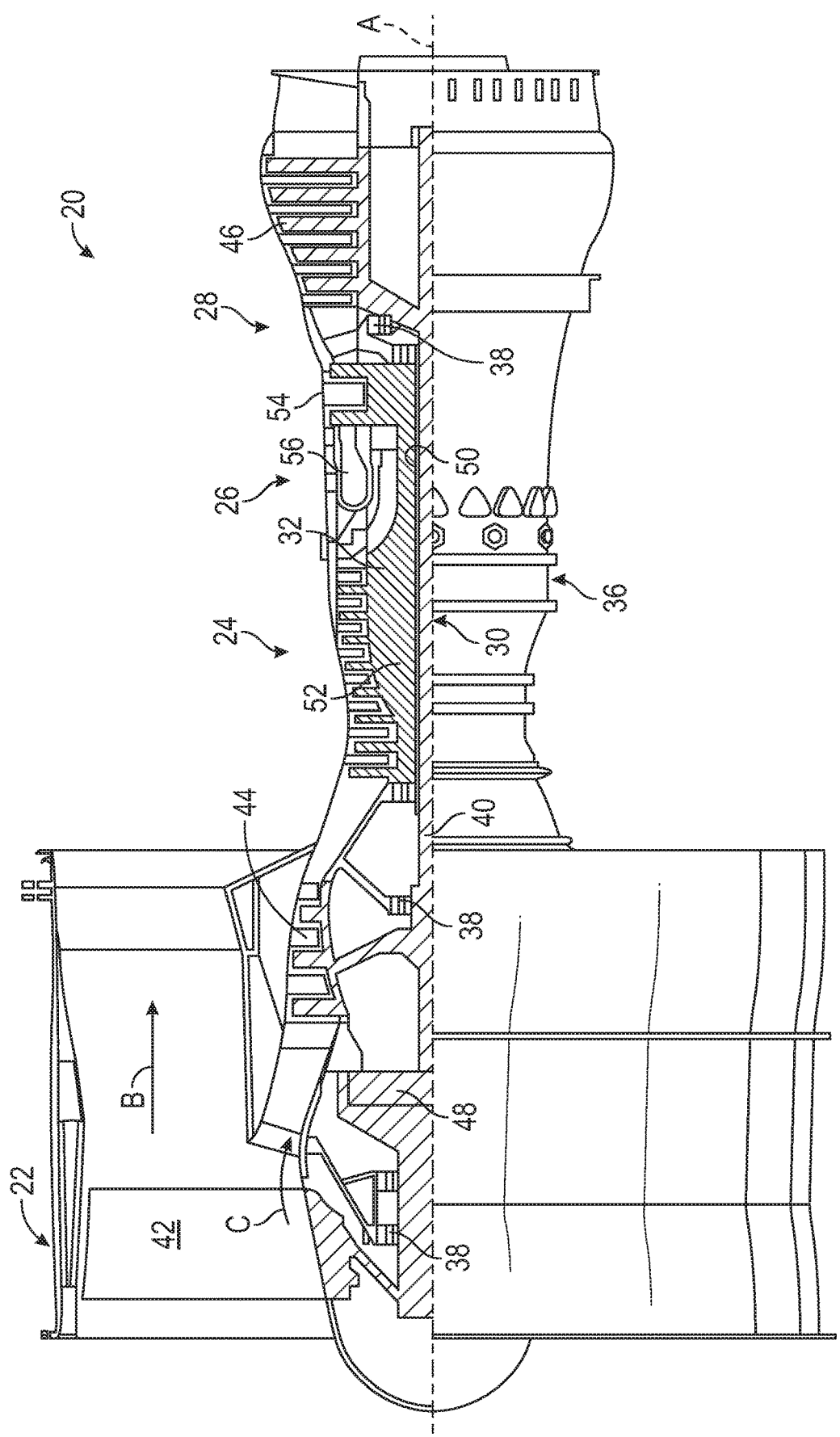
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition-typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ("TSFC")"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram \,°\, R)/(518.7°\, R)]^{0.5}$. The "Low corrected fan tip speed" as disclosed herein according to one non-limiting embodiment is less than about 1150 ft/second (350.5 m/sec).

Figure 2:
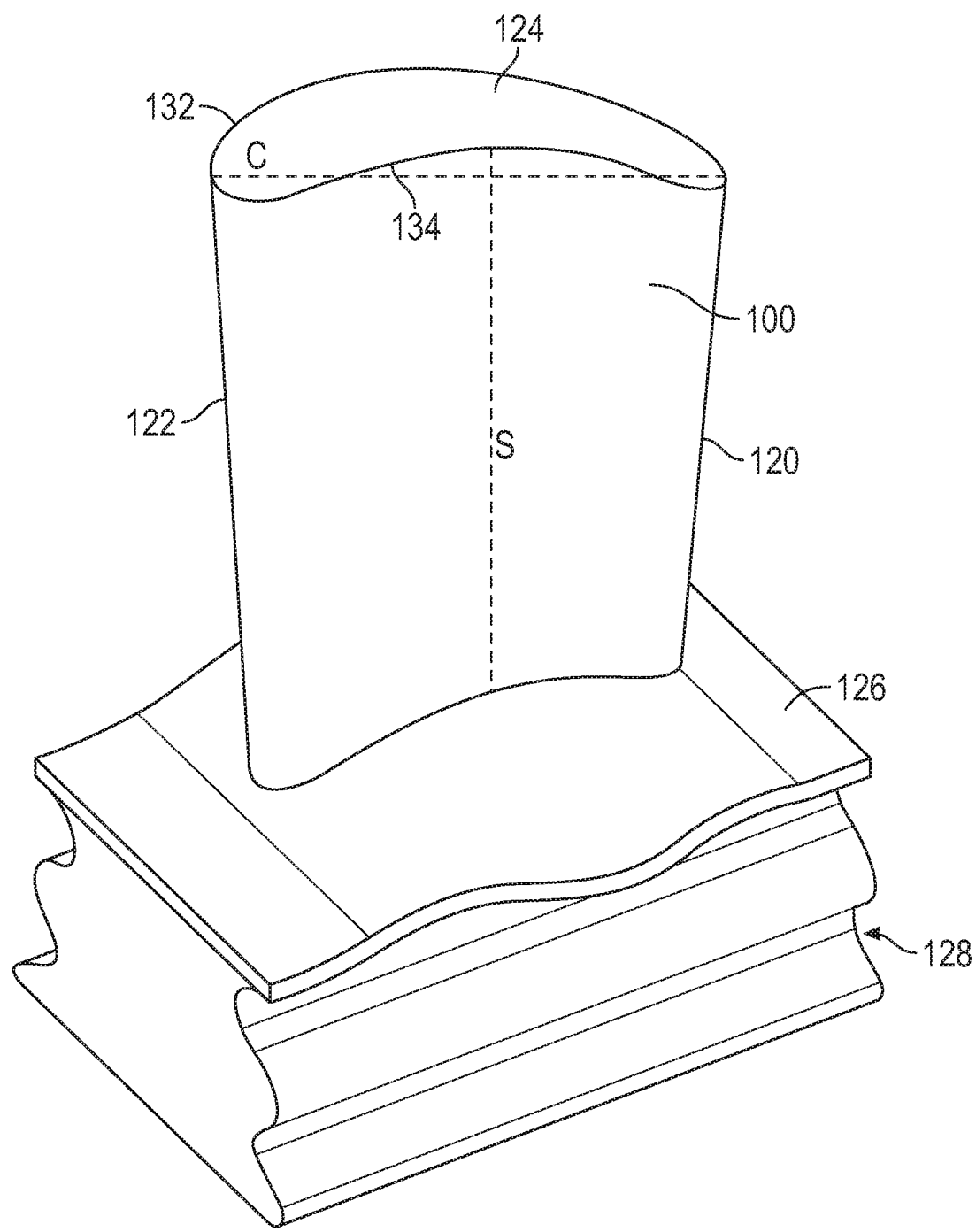
FIG. 2 is a perspective view of an airfoil in a gas turbine engine, in accordance with an embodiment of the disclosure.

Referring now to FIG. 2, with continued reference to FIG. 1, an airfoil 100 is illustrated, in accordance with an embodiment of the present disclosure. The airfoil 100 comprises a trailing edge 120 facing about an aft direction in a gas turbine engine 20 and a leading edge 122 facing about a forward direction in the gas turbine engine 20. The airfoil 100 also comprises a pressure side 134 facing about an aft direction in a gas turbine engine 20 and a suction side 132 facing about a forward direction in the gas turbine engine 20. A top 124 of the airfoil 100 faces radially outward when the airfoil 100 is installed in a rotating compressor section 24 of a gas turbine engine 20. A platform 126 forms an inner boundary of a gas flow path in the gas turbine engine 20. An attachment 128 couples airfoil 100 to a rotor or stator. The chord at a top 124 of the airfoil 100 (i.e., the tip chord) is illustrated as a chord C. The radial span of the airfoil 100, which is described as the length of the airfoil 100, is illustrated as span S.

Figure 3A:
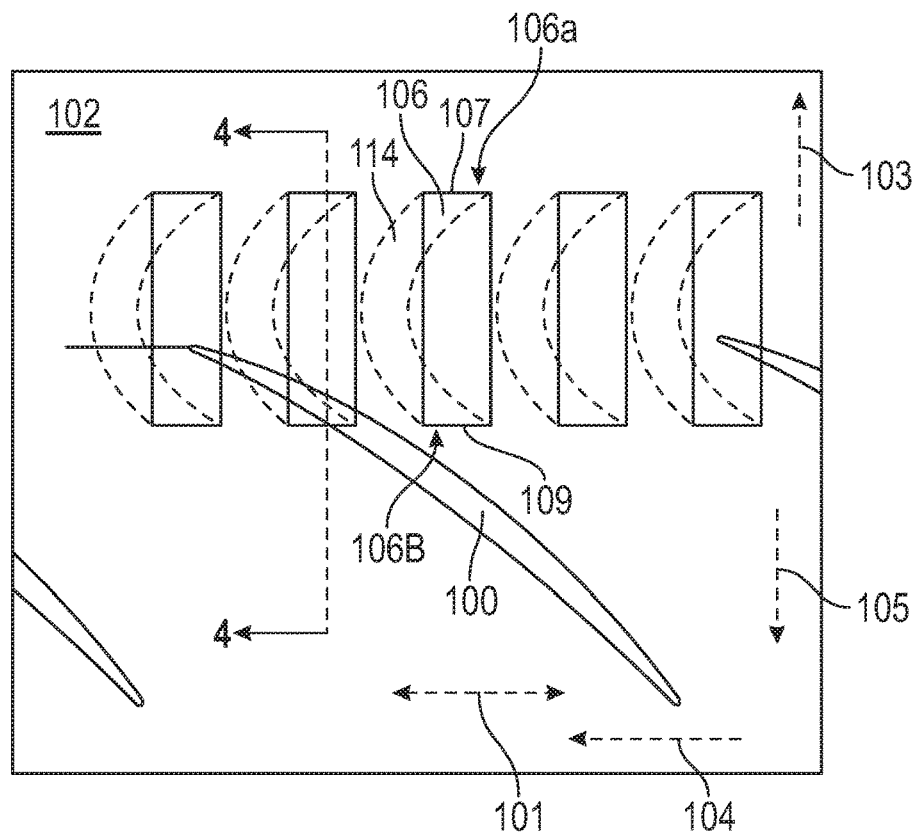
FIG. 3A is a view of a groove on a casing opposite an airfoil in a gas turbine engine, in accordance with an embodiment of the disclosure.
Figure 3B:
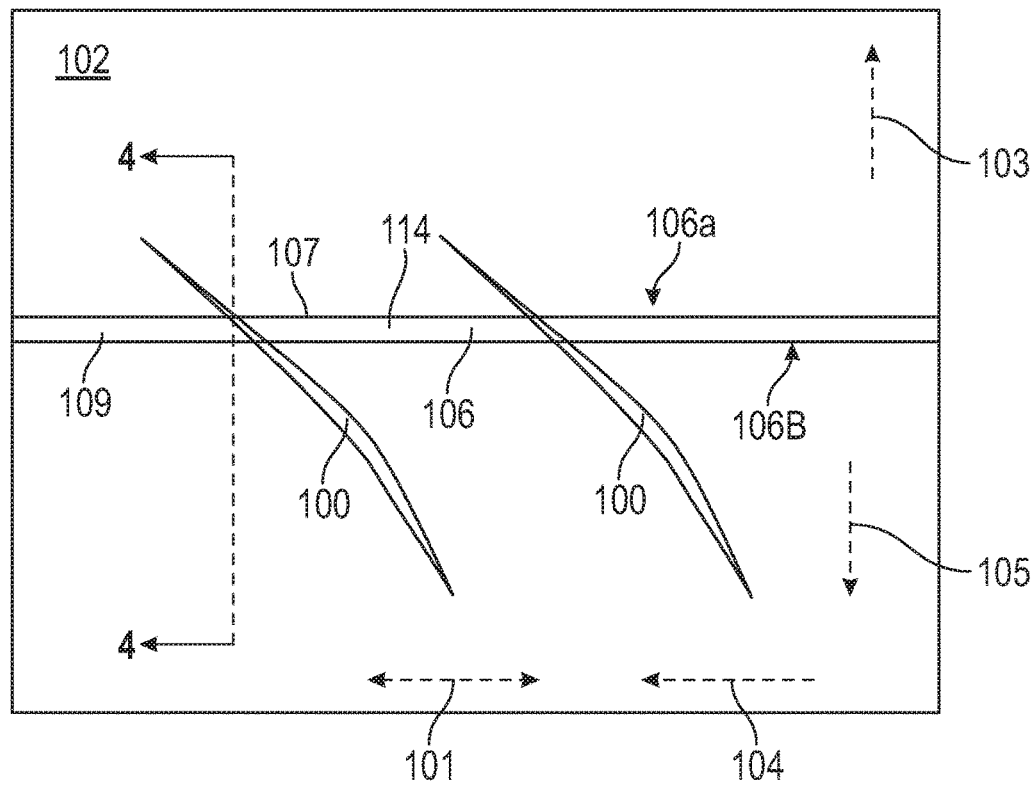
FIG. 3B is a view of a groove on the casing opposite an airfoil in a gas turbine engine, in accordance with an embodiment of the disclosure.

Referring now to FIGS. 3A and 3B, with continued reference to FIGS. 1-2, the airfoil 100 and a casing 102 of the gas turbine engine are illustrated, in accordance with an embodiment of the present disclosure. The airfoil 100 and the casing 102 may be located in a rotating compressor section 24 of a gas turbine engine 20. The airfoil 100 may rotate circumferentially around the engine central longitudinal axis A (see FIG. 1) in a rotational direction 104. The casing 102 may extend circumferentially around the engine central longitudinal axis A, such that the casing 102 forms a circle around the engine central longitudinal axis A. FIGS. 3A and 3B illustrate a groove 106 located within the casing 102 of the gas turbine engine. FIGS. 3A and 3B illustrate different configurations of the groove 106 located within the casing 102 of the gas turbine engine.

In the example illustrated in FIG. 3A, the casing 102 may include multiple separate grooves 106 arranged circumferentially around the casing 102 in the circumferential direction 101. The multiple separate grooves may be arranged intermittently around the casing 102. In FIG. 3A, each groove 106 is defined by a forward groove wall 107, an aft groove wall 109 located opposite the forward groove 107, and a base groove wall 114 interposed between the forward groove wall 107 and the aft groove wall 109. The forward groove wall 107 is located on a forward end 106A of the groove 106 towards the forward direction 103 and the aft groove wall 109 is located on an aft end 106B towards the aft direction 105.

In the example illustrated in FIG. 3B, the casing 102 may include a single groove 106 that extends circumferentially around the casing 102 in the circumferential direction 101. In FIG. 3B, the groove 106 includes a forward groove wall 107 and an aft groove wall 109 located opposite the forward groove wall 107. The forward groove wall 107 is located on a forward end 106A of the groove 106 towards the forward direction 103 and the aft groove wall 109 is located on an aft end 106B towards the aft direction 105.

Figure 4:
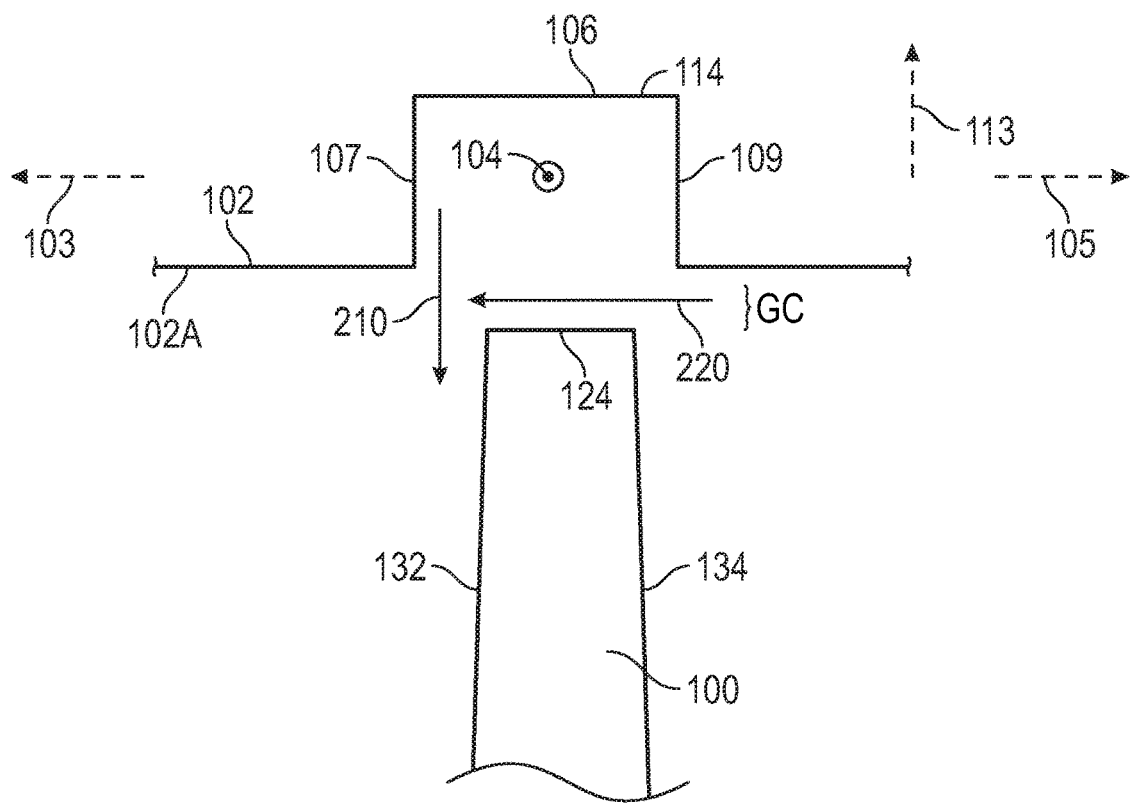
FIG. 4 is a view of tip leakage flow between an airfoil and a groove, in accordance with an embodiment of the disclosure.

Referring now to FIG. 4, with continued reference to FIGS. 1-3A, and 3B, an airfoil 100 and a casing 102 are shown with a gap clearance GC separating the top 124 of the airfoil 100 and the casing 102, in accordance with an embodiment of the present disclosure. The casing 102 may be located radially outward from the airfoil 100 or radially inward from the airfoil 100. The casing 102 may be a static member or a rotating member of the gas turbine engine 20. In one embodiment, the airfoil 100 may be a rotating member (e.g., a blade) and the casing 102 may be a static member (e.g., a fan/blade casing) located radially outward of the airfoil 100. In another embodiment, the airfoil 100 may be a static member (e.g., a stator) and the casing 102 may be a rotating member located radially inward of the airfoil 100.

As shown in FIG. 4, the airfoil 100 also comprises the pressure side 134 facing about the aft direction 105 in the gas turbine engine 20 and the suction side 132 facing about the forward direction 103 in the gas turbine engine 20. Also illustrated in FIG. 4, is the groove 106 within the casing 102 located opposite of the airfoil 100, which rotates in a direction of rotation 104. The groove 106 is recessed in a radially outward direction 113 from a radially inward surface 102A of the casing 102 located at the section of the gas turbine engine 20 where the groove 106 is located. The groove 106 may improve stability margin by helping to modify the trajectory and strength of the tip clearance vortex.

Figure 5A:
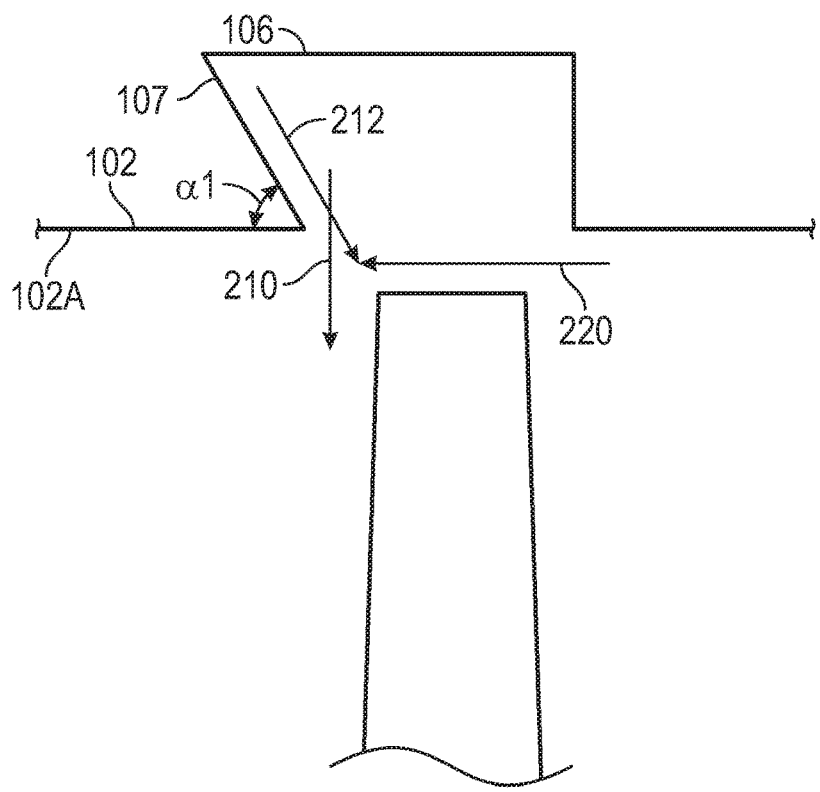
FIG. 5A is a view of a forward groove wall of the groove operably shaped to reduce tip leakage flow, in accordance with an embodiment of the disclosure.
Figure 5B:
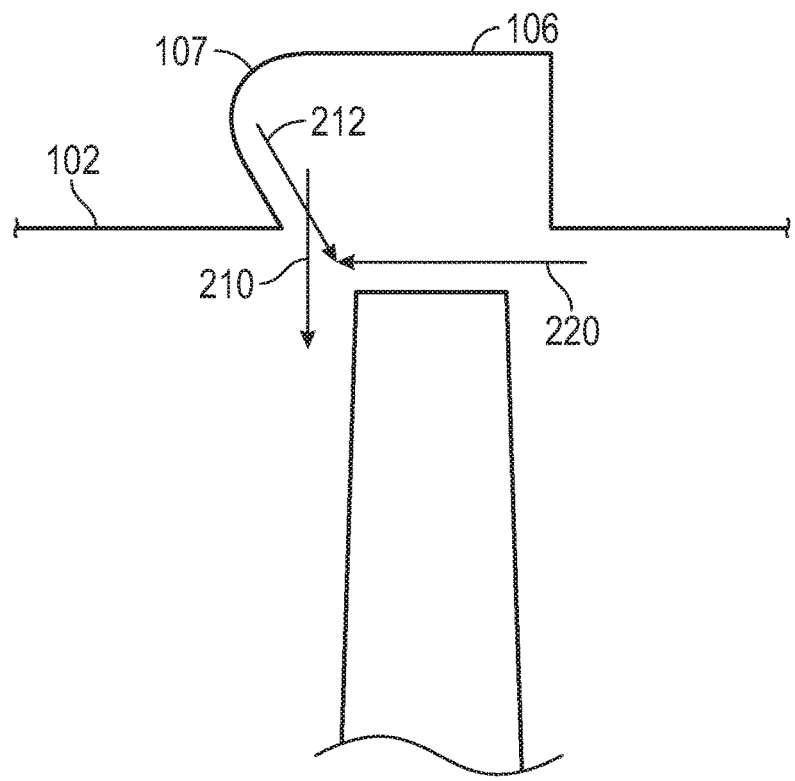
FIG. 5B is a view of a forward groove wall of the groove operably shaped to reduce tip leakage flow, in accordance with an embodiment of the disclosure.

The groove 106 aids in mitigating the deleterious effects of the tip clearance vortex by the generation of a negative radial velocity air jet (i.e. radially inward) 210 generated by the groove 106 along the suction side 132 proximate the blade tip 124. This negative radial velocity air jet 210 counteracts the negative axial momentum of a tip leakage flow 220, resulting in a weaker tip clearance vortex and mitigated double leakage flow, therefore improving the stability margin. Double leakage flow may be defined as when the airflow leaks over more than one blade tip 124. The embodiments disclosed herein seek to enhance the effectiveness of the negative radial velocity air jet 210 offsetting the tip leakage flow 220, as illustrated in FIGS. 5A and 5B. The embodiments disclosed herein also seek to target improving the efficiency at the design point (e.g., rather than targeting the vortex behavior at the stall point) by preventing the reversed leakage flow from separating off the aft edge (e.g., aft groove walls 109) of the groove 106, as illustrated in FIGS. 6A, 6B, and 6C.

Referring now to FIGS. 5A and 5B, with continued reference to FIGS. 1, 2, 3A, 3B, and 4, forward groove walls 107 are illustrated, in accordance with an embodiment of the present disclosure. In the embodiment illustrated in FIGS. 5A and 5B, the forward groove wall 107 of the groove 106 may be operably shaped to generate an aft directed jet 212, which may be a component of the negative radial velocity air jet 210. The aft directed jet 210 is configured to more directly oppose the tip leakage flow 220 than the negative radial velocity air jet 210, thus reducing the tip leakage flow. In the example illustrated in FIG. 5A, the forward groove wall 107 may be operably shaped in a linear fashion (i.e., linearly shaped), as shown in FIG. 5A, to generate the aft directed jet 212. For example, the forward groove wall 107 may be orientated at an acute angle α1 relative to a radially inward surface 102A of the casing 102. Conventionally, the forward groove wall 107 is orientated about perpendicular relative to the radially inward surface 102A of the casing 102, as shown in FIG. 4. In the example illustrated in FIG.

5B, the forward groove wall 107 may be operably shaped in a non-linear fashion (i.e., curved) to generate the aft directed jet 212. For example, the forward groove wall 107 may be concave in shape, as shown in FIG. 5B.

Figure 6A:
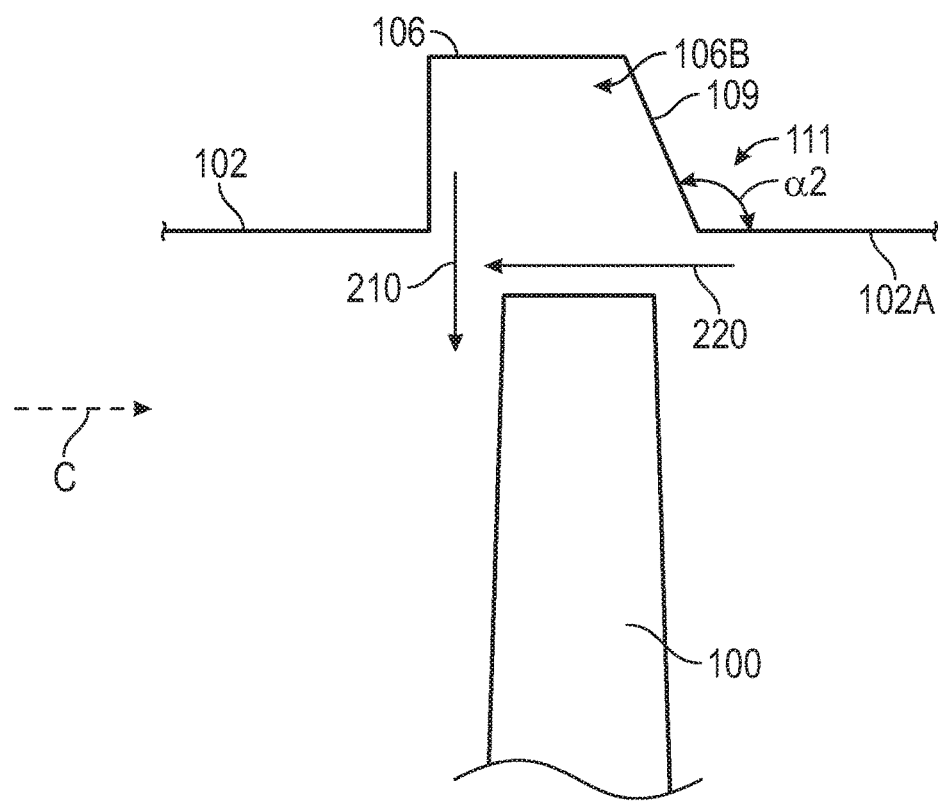
FIG. 6A is a view of an aft groove wall of the groove operably shaped to reduce tip leakage flow, in accordance with an embodiment of the disclosure.
Figure 6B:
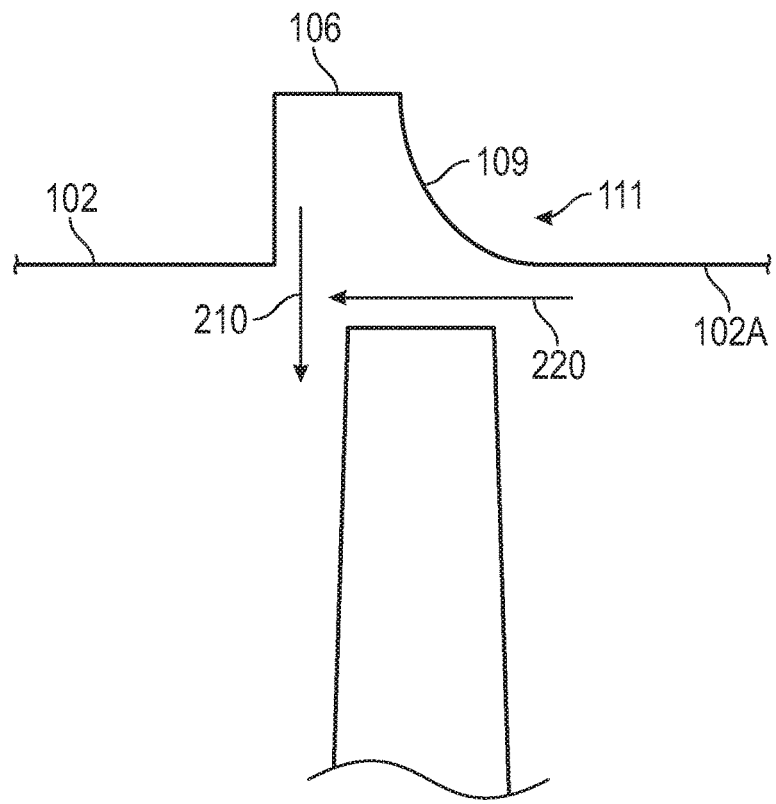
FIG. 6B is a view of an aft groove wall of the groove operably shaped to reduce tip leakage flow, in accordance with an embodiment of the disclosure.
Figure 6C:
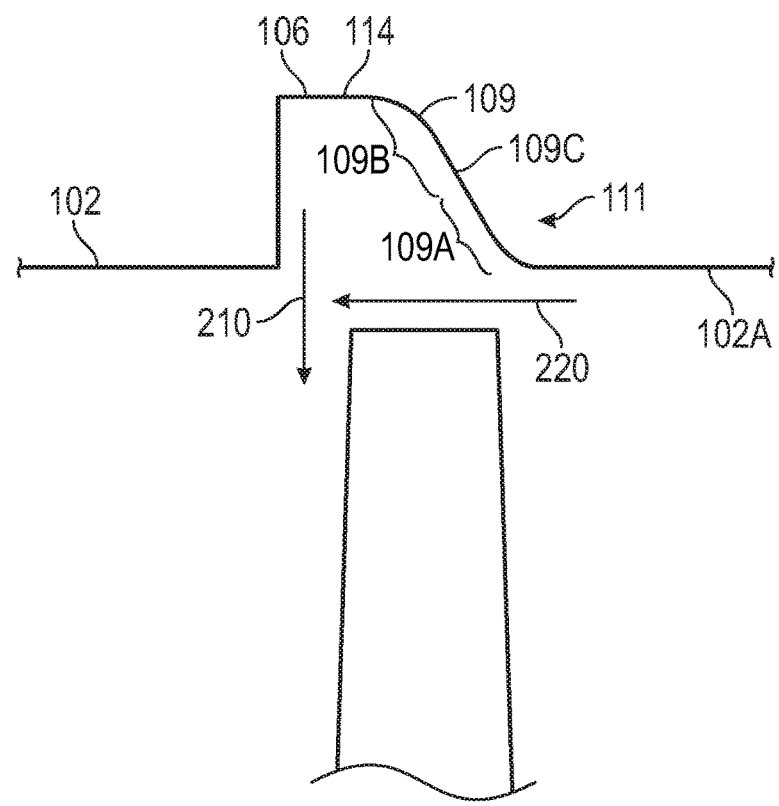
FIG. 6C is a view of an aft groove wall of the groove operably shaped to reduce tip leakage flow, in accordance with an embodiment of the disclosure.

Referring now to FIGS. 6A, 6B, and 6C, with continued reference to FIGS. 1, 2, 3A, 3B, and 4, aft groove walls 109 are illustrated, in accordance with an embodiment of the present disclosure. In the embodiment illustrated in FIGS. 6A-6C, the aft groove wall 109 of the groove 106 may be operably shaped to reduce airflow separation proximate an intersection 111 of the radially inward surface 102A of the casing 102 and the aft groove wall 109.

Advantageously, operably shaping the aft groove wall 109 to reduce airflow separation proximate an intersection 111 also helps to reduce recirculation in the aft upper corner 106B of the groove 106, which is a further source of entropy generation. Operably shaping the aft groove wall 109 to reduce airflow separation proximate an intersection 111 can prevent the formation of a vortex that gets dragged into the flow path C as the airfoil 100 moves away from the groove 106. This should reduce blockage and entropy generation at the design operating point, reducing the efficiency penalty associated with the groove 106. By reducing recirculation within the groove 106, the entropy of the reinjected flow is also reduced, further reducing the efficiency penalty at the design operating point.

In the example illustrated in FIG. 6A, the rearward groove wall 109 may be operably shaped in a linear fashion (i.e., linearly shaped), as shown in FIG. 6A, to reduce airflow separation proximate an intersection 111 of the radially inward surface 102A of the casing 102 and the aft groove wall 109. For example, the aft groove wall 109 may be orientated at an obtuse angle α2 relative to the radially inward surface 102A of the casing 102. Conventionally, the aft groove wall 109 is orientated about perpendicular relative to the radially inward surface 102A of the casing 102, as shown in FIG. 4. In the example illustrated in FIGS. 6B and 6C, the aft groove wall 109 may be operably shaped in a non-linear fashion (i.e., curved) to reduce airflow separation proximate an intersection 111 of the radially inward surface 102A of the casing 102 and the aft groove wall 109. For example, the aft groove wall 109 may be convex in shape, as shown in FIG. 6B. In another example, the aft groove wall 109 may be convex and concave in shape, as shown in FIG. 6C. In the embodiment, the aft groove wall 109 may include a convex portion 109A and a concave portion 109B. The convex portion 109A may be located proximate the radially inward surface of the casing 102, as shown in FIG. 6C. The convex portion 109A may extend from the radially inward surface 102A to an intermediate point 109C of the aft groove wall 109 and the concave portion 109B may extend from the intermediate point 109C to the base groove surface 114. In an embodiment, the intersection 111 of the radially inward surface 102A of the casing 102 and the aft groove wall 109 may be a fillet (i.e., rounded or curved), as shown in FIGS. 6A, 6B, and 6C.

It is understood that the shapes of forward groove wall 107 and the aft groove wall 109 are discussed independently of each other but any shape for the forward groove wall 107 may be combined with any shape for the aft groove wall 109.

Technical effects of embodiments of the present disclosure include operably shaping at least one of a forward groove wall and an aft groove wall to improve stability margin of a section of a gas turbine compressor and/or to improve design operating point efficiency of a section of a gas turbine compressor.

As used herein, "aft" refers to the direction associated with the tail/back of an aircraft, or generally, to the direction of exhaust of the gas turbine. As used herein, "forward" refers to the direction associated with the nose/front of an aircraft, or generally, to the direction of flight or motion.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A compressor for use in a gas turbine engine, the compressor comprising:
    an airfoil configured to rotate about an engine central longitudinal axis of the gas turbine engine, wherein the airfoil further comprises a blade tip;
    a casing, the casing including a radially inward surface; and
    a groove located within the casing opposite the airfoil, the groove is recessed in a radially outward direction from the radially inward surface of the casing, wherein the groove is defined by a forward groove wall, an aft groove wall opposite the forward groove wall, and a base groove interposed between the forward groove wall and the aft groove wall, and
    wherein the forward groove wall is operably shaped to generate an aft directed jet,
    wherein the groove is wider than the blade tip as measured forward to aft,
    wherein the aft groove wall is operably shaped to reduce airflow separation proximate an intersection of the radially inward surface of the casing and the aft groove wall,
    wherein the aft groove wall is curved in shape, and
        wherein the aft groove wall is convex in shape or the aft groove wall includes a convex portion and a concave portion.

2. The compressor of claim 1, wherein the forward groove wall is curved in shape.

3. The compressor of claim 2, wherein the forward groove wall is concave in shape.

4. The compressor of claim 1, wherein the forward groove wall is oriented at an acute angle relative to the radially inward surface of the casing proximate where the forward groove intersects with the radially inward surface of the casing.

5. The compressor of claim 1, wherein the aft groove wall is oriented at an obtuse angle relative to the radially inward surface of the casing.

6. The compressor of claim 1, wherein the casing is located radially outward from the airfoil.

7. A compressor for use in a gas turbine engine, the gas turbine engine comprising:
   an airfoil configured to rotate about an engine central longitudinal axis of the gas turbine engine, wherein the airfoil further comprises a blade tip;
   a casing, the casing including a radially inward surface; and
   a groove located within the casing opposite the airfoil, the groove is recessed in a radially outward direction from the radially inward surface of the casing, wherein the groove is defined by a forward groove wall, an aft groove wall opposite the forward groove wall, and a base groove interposed between the forward groove wall and the aft groove wall,
   wherein the aft groove wall is operably shaped to reduce airflow separation proximate an intersection of the radially inward surface of the casing and the aft groove wall,
   wherein the aft groove wall is curved in shape,
   wherein the groove is wider than the blade tip as measured forward to aft, and
   wherein the aft groove wall is convex in shape or the aft groove wall includes a convex portion and a concave portion.

8. The compressor of claim 7, wherein the casing is located radially outward from the airfoil.

9. A fan case for use in a gas turbine engine, the fan case being configured to enclose an airfoil rotating about an engine central longitudinal axis of a gas turbine engine, the fan case comprising:
   a groove located within the fan case opposite the airfoil, the groove is recessed in a radially outward direction from a radially inward surface of the fan case, wherein the groove is defined by a forward groove wall, an aft groove wall opposite the forward groove wall, and a base groove interposed between the forward groove wall and the aft groove wall, and
   wherein the forward groove wall is operably shaped to generate an aft directed jet,
   wherein the groove is wider than a blade tip of the airfoil as measured forward to aft,
   wherein the aft groove wall is operably shaped to reduce airflow separation proximate an intersection of the radially inward surface of the fan case and the aft groove wall,
   wherein the aft groove wall is curved in shape, and
     wherein the aft groove wall is convex in shape or the aft groove wall includes a convex portion and a concave portion.

\* \* \* \* \*